Feb. 17, 1953 — E. A. WAHL ET AL — 2,628,708
ARTICLE RAISING OR LOWERING CONVEYER
Filed Jan. 25, 1951 — 2 SHEETS—SHEET 1
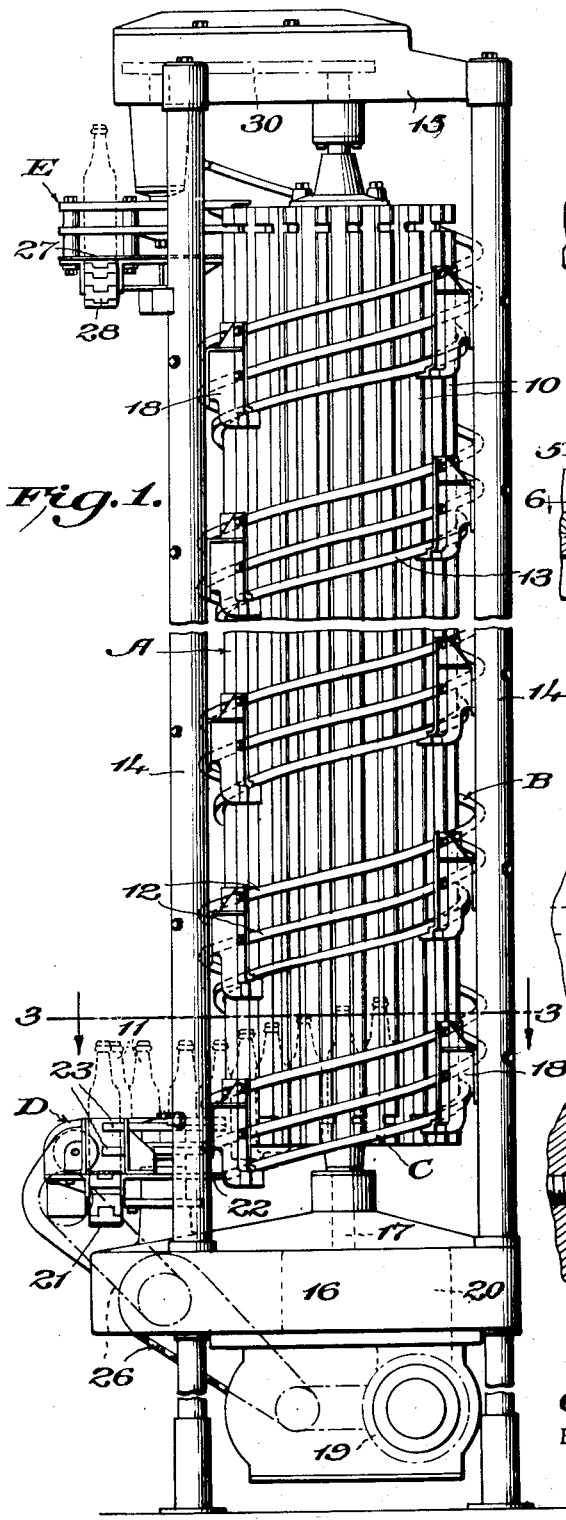
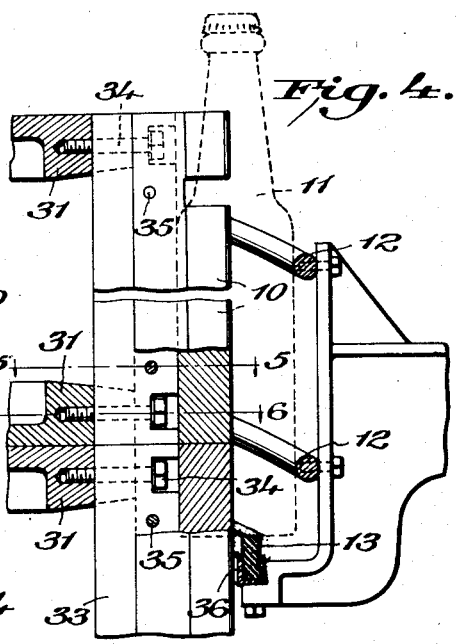
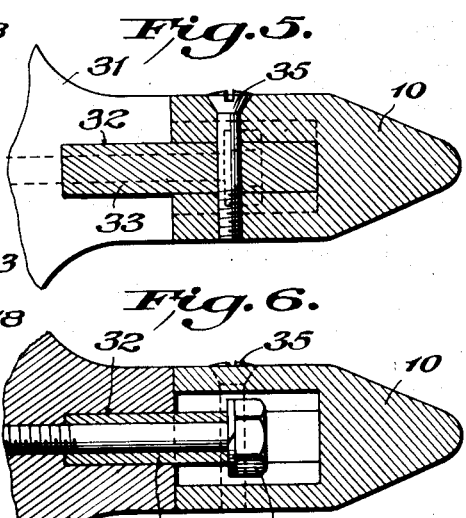
INVENTORS
Eugene A. Wahl,
Wilhelm Boehl,
Otto A. Badenhausen,
BY 
ATTORNEY

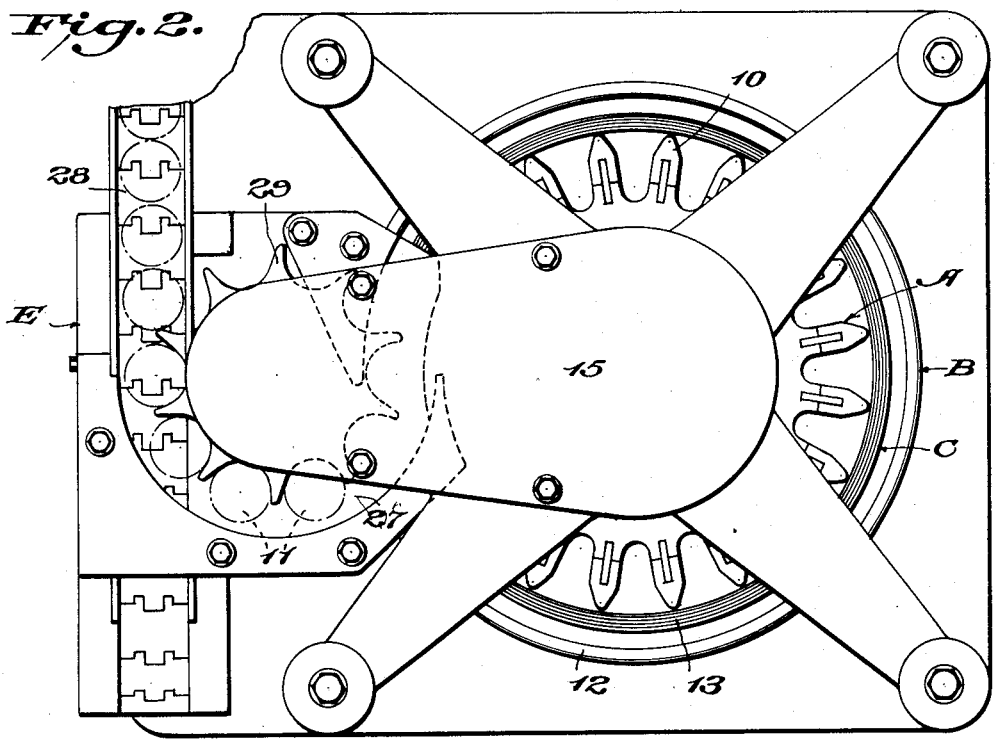
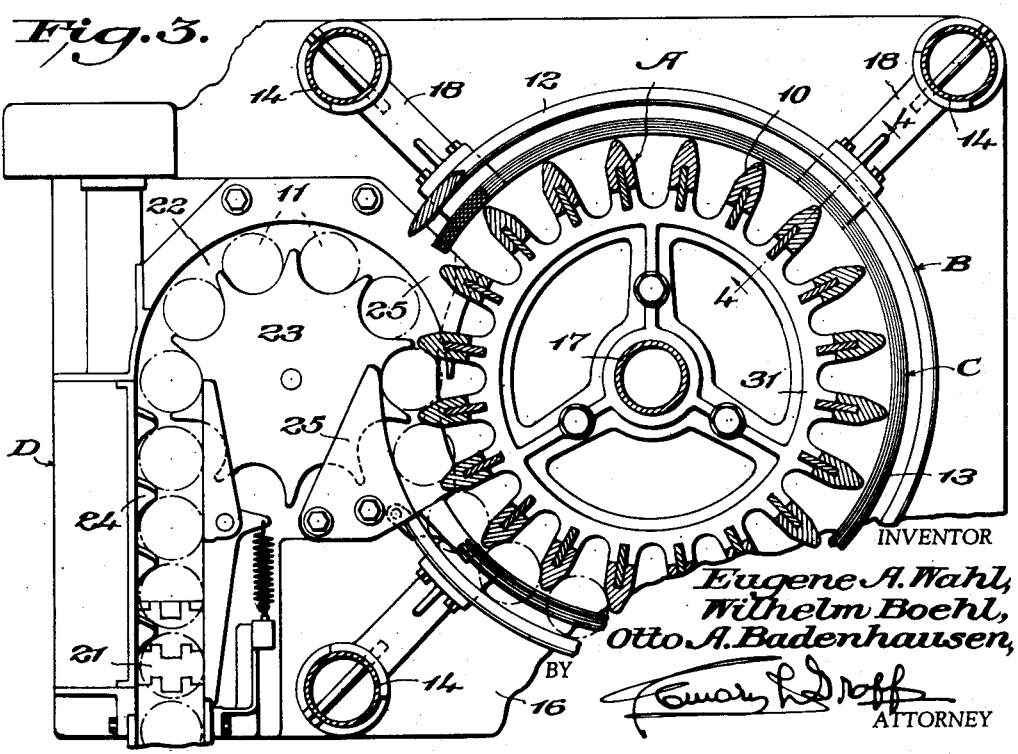

Patented Feb. 17, 1953

2,628,708

UNITED STATES PATENT OFFICE 2,628,708

ARTICLE RAISING OR LOWERING CONVEYER

Eugene A. Wahl, Garden City, N. Y., Wilhelm Boehl, Union, and Otto A. Badenhausen, Brookside, N. J., assignors to P. Ballentine & Sons, Newark, N. J., a corporation of New Jersey Application January 25, 1951, Serial No. 207,802

6 Claims. (Cl. 198—212)

This invention relates to conveyors, and has particular reference to improvements in conveyors which are specially designed to raise or lower articles, such as bottles, cans and the like, and which are of the known general type comprising an annular series of vertically disposed, rotatable article pusher bars and surrounding articles supporting and guiding means of helical form along which the articles are pushed by the pusher bars, whereby they are caused to be raised or lowered, depending upon the direction of rotation of the pusher bars.

Generally speaking, the object of the invention is to provide a conveyor of the type mentioned which is of simple, practical construction and thoroughly reliable and efficient in operation.

More particularly, a special and important object of the invention is to provide a conveyor of the type mentioned in which the article supporting and guiding means are of such open design as to be devoid of corners or pockets wherein broken bottle fragments or the like might lodge and interfere with proper operation of the conveyor.

Another special and important object of the invention is to provide a conveyor of the type mentioned which includes a single article supporting rail so located with respect to the pusher bars and article guide rails as to support the articles along lines extending substantially diametrically across their bottoms, whereby there is offered least frictional resistance to movement of the articles along said supporting rail and there is little or no tendency of the articles to be disadvantageously rotated as they are pushed along said supporting rail, as would be the case if the articles rested at one side or the other of their axes upon a supporting rail.

Another object of the invention is to provide in a conveyor of the type mentioned, an article pusher unit of novel economical, light-weight construction.

Another object of the invention is to provide novel means for feeding articles to the conveyor and for removing them from the conveyor.

With the foregoing and other objects in view, as will become more fully apparent as the nature of the invention is better understood, the same consists in a conveyor of the general type mentioned embodying the novel features of construction, combination and arrangement of parts as are illustrated by way of example in the accompanying drawings and as will be hereinafter more fully described and claimed.

In the accompanying drawings, wherein like characters of reference denote corresponding parts in the different views:

Figure 1 is a side elevation of a conveyor constructed in accordance with one practical embodiment of the invention.

Figure 2 is a top plan view of the conveyor.

Figure 3 is a cross section taken approximately on the line 3—3 of Figure 1.

Figure 4 is a fragmentary section taken on the line 4—4 of Figure 3.

Figure 5 is a section on the line 5—5 of Figure 4; and

Figure 6 is a section on the line 6—6 of Figure 4.

Referring to the drawings in detail, it will be observed that the present conveyor is of the known general type comprising a vertically disposed, rotatable article pusher unit, designated generally as A, and surrounding article guide means and helical article supporting means designated generally as B and C, respectively.

Generally speaking, the article pusher unit A comprises an annular series of article pusher bars 10 which extend longitudinally and radially, or substantially radially, relative to said unit and which are spaced apart annularly of said unit to accommodate therebetween the inner side portions of articles, such as the bottles indicated at 11, to be raised or lowered.

To limit inward movement of the bottles or other articles 11 relative to the unit A, the spaces between the bars 10 may be either of limited depths or they may be inwardly tapered as shown. In any event, the arrangement in this respect is such that, for articles of any given diameter, only the inner side portions of the articles are receivable in the spaces between the bars 10 so that somewhat more than the outer half portions and hence the longitudinal axes of the articles are disposed outwardly of the outer edges of the pusher bars 10.

While the article guide means B may be of any suitable form, it preferably is composed of a pair of vertically spaced guide rails 12 which are disposed in surrounding, coaxial relationship to the article pusher unit A and which, for articles of any given diameter, are spaced outwardly from the outer edges of the pusher bars 10 distances such as to engage or to have only slight clearance from the outer sides of the bottles or other articles 11 when the latter are at their limits of inward movement in the spaces between the pusher bars 10. Said guide rails 12 thus cooperate with the pusher bars 10 to maintain the articles 11 in upright positions in the spaces between the pusher bars 10 and to constrain the articles to be moved in a circular path by the pusher unit A as the latter is rotated.

The helical article supporting means C has the same helical pitch as the article guide rails 12 and is in the form of a single rail 13 disposed in surrounding relationship to the article pusher unit A, coaxially therewith and suitably below the lowermost guide rail 12, and closely adjacent to the outer edges of the pusher bars 10 so that it extends substantially diametrically across the bottoms of the bottles or other articles 11 resting thereon and confined between the guide rails 12 and the pusher bars 10. Said article supporting rail 13 is, of course, fixed and, hence, as the bottles or other articles are pushed in a circular path by the article pusher bars 10, they are caused to be moved vertically between said pusher bars due to the helical form of said article supporting rail and to resting upon and being pushed along said rail.

Due to the illustrated and described arrangement of the parts of the present conveyor whereby the article supporting rail 13 extends substantially diametrically across the bottoms of the bottles or other articles 11 resting thereon, it is apparent that there is little or no tendency of said article supporting rail to effect rotation of the bottles or other articles 11 about their own axes as they are advanced along said article supporting rail and as would be the case if said article supporting rail were disposed to engage the bottoms of the articles appreciably outwardly of their longitudinal axes. Avoidance of rotation of the articles 11 is important for different reasons, among which may be mentioned that in cases where the articles are provided with labels, rotation of the articles might result in mutilation or removal of the labels due to the latter wiping against the pusher bars 10 or the guide rails 12, while in cases where the articles are of glass and have side embossings, rotation of the articles might result in the embossings striking the pusher bars 10 or the guide rails 12 with consequent fracture or breakage of the articles. Moreover, elimination of rotation of the articles reduces friction and correspondingly reduces the amount of power required to rotate the article pusher unit A. Furthermore, because of the inward and downward spacing of the article supporting rail 13 from the lowermost guide rail 12, and to the spacing of the guide rails 12 from each other, there are avoided any closed or substantially closed corners or pockets wherein fragments of broken articles might lodge and interfere with proper operation of the conveyor.

While any suitable means may be provided for mounting the different parts of the present conveyor in proper cooperation relationship to each other, one suitable means for this purpose may consist of a frame composed of a plurality of standards 14 disposed outwardly of the article guide rails 12 and rigidly connected together at or adjacent to their tops and bottoms by gear casings 15 and 16, respectively. The article pusher unit A is constructed about a central drive shaft 17 and this shaft is journaled in the gear casings 15 and 16 whereby said article pusher unit is mounted for rotation. On the other hand, suitable brackets 18 are rigidly fastened to the standards 14 and extend inwardly therefrom and have the article guide rails 12 and the article supporting rail 13 suitably fastened thereto whereby said guide and supporting rails are properly mounted relative to each other and relative to the article pusher unit A.

Adjacent to one end of the article pusher unit A is suitably mounted a suitable means, designated generally as D, for feeding articles to the spaces between the pusher bars 10, while adjacent to the other end of said pusher unit A is suitably mounted a suitable means, designated generally as E, for removing articles from the conveyor. In this connection, the drawings illustrate a conveyor which is designed to elevate articles. Therefore, the article feeding means D and the article removing means E are located adjacent to the lower and the upper ends, respectively, of the conveyor, and the article pusher unit is rotated in a direction to urge the articles 11 upwardly along the rail 13. As will be understood, however, the locations of the means D and E may be reversed and the article pusher unit may be rotated in the opposite direction to adapt the conveyor for lowering articles.

Any suitable means may be provided for driving the article pusher unit A. In this connection and as indicated in the drawings, a suitable means for this purpose may comprise an electric motor 19 within the gear housing 16 connected through a suitable speed reduction gearing, designated generally as 20, to the shaft 17 of said article pusher unit A.

While the article feeding means D may be of any suitable design, it preferably comprises, as shown, a horizontally disposed, article feed belt 21 spaced a suitable distance outwardly from the article supporting plate 22 and extending between said belt 21 and the unit A and upon which the articles are delivered by said belt; a horizontally disposed, rotatable article transfer star wheel 23 overlying the plate 22 and interposed between the belt 21 and the article pusher unit A; a horizontally disposed, rotatable screw element 24 engageable with the articles as the latter are delivered by the belt 21 to the plate 22 and operable in properly timed relationship to rotation of the star wheel 23 for feeding the articles to said star wheel; and suitable guide means, such as plates 25, overlying the plate 22 and serving to retain the articles in the article-accommodating recesses in the periphery of the star wheel 23 as the latter acts by its rotation to transfer or slide the articles over the plate 22 from the belt 21 to the spaces between the pusher bars 10 of the article pusher unit A.

Appropriately the star wheel 23 and the screw element 24 may be driven by the motor 19 through the instrumentality of sprocket wheels and sprocket chains as indicated conventionally at 26. In any event, the rates of rotation of the star wheel 23 and the article pusher unit A are such that the articles 11 are fed singly to the successive spaces between the pusher bars 10.

The lower end portion of the article supporting rail 13 is disposed to have the articles 11 move onto the same as they are moved off the plate 22 by the bars 10 of the article pusher unit A. Thereafter the articles are advanced along said rail 13 by the bars 10 and are elevated due to the helical form of said rail. As they are elevated they slide, of course, upwardly between the bars 10.

As in the case of the article feeding means D, the article removing means E may be of any suitable design. Preferably, however, it is of the same general design as the article feeding means and comprises a horizontally disposed plate 27 upon which the articles are delivered from the upper end of the article supporting rail 13; a belt 28 for conveying the articles from said plate 27; and a rotatable star wheel 29 disposed horizontally in overlying relationship to said plate 27 and interposed between the article pusher unit A and the belt 28 for transferring the articles over said plate 26 from said article pusher unit A to said belt 27. Appropriately, the star wheel 29 may be driven from the upper end of the shaft 17 through a suitable drive connection in the upper gear housing 15 as indicated at 30. In any event, the star wheel 29 is rotated at a rate with respect to rotation of the article pusher unit A so as positively to remove the articles singly from said unit A and to transfer them to the belt 28.

In order that the present conveyor may be of low production cost and light-weight, the pusher bars 10 preferably are formed from wood or some other light-weight, low cost material. In this connection and in order to mount said bars upon the shaft 17 in a simple, practical, light-weight manner and so that they are rigid throughout their lengths, wheels 31 are suitably fixed to said shaft 17 at points spaced apart therealong, and are provided at annularly spaced points with longitudinally extending slots 32 which open through their peripheries. Extending between the wheels 31 are stiff metal bars 33 the inner portions of which are snugly accommodated in the slots 32 and the outer portions of which extend outwardly beyond the peripheries of said wheels. Bolts 34 serve to fasten said bars 33 rigidly to the wheels 31.

The inner portions of the article pusher bars 10 are bifurcated and are snugly engaged over the outer or projecting portions of the bars 33 and are securely fastened to said projecting portions of said bars 33 by suitable fastenings such as screws 35. It will thus be apparent that the article pusher unit A is of simple, practical, light-weight construction; also, that the pusher bars 10 are stiffened and reinforced by the bars 33 and are readily replaceable when necessary or desirable.

For conveyors of low height the bars 10 and 33 may, of course, be of one-piece construction, while for conveyors of considerable height said bars may be composed of separate sections of any desired lengths as will be apparent from Figure 4 of the drawings.

While the article supporting rail 13 may be formed in any suitable manner from any desired material, it preferably is formed from soft rubber, because this material has been found most resistant to wear by the articles sliding along the same. As illustrated in Figure 4 of the drawings, said rail 13 may be mounted in a helical channel member 36 which is of substantially U-shape in cross section and which may be bolted or otherwise suitably fastened to the brackets 18. The side legs or flanges of the channel member 36 converge upwardly and the rail 13 is stretched and thereby cross sectionally contracted prior to insertion of its lower portion into said channel member. Upon insertion of the lower portion of said rail into said channel member the stretching force exerted upon said rail is released. Hence, the lower portion of said rail expands into said channel member 36 and thereby becomes firmly secured therein, leaving the upper portion of the rail exposed to be engaged by the bottoms of bottles or other articles to be raised or lowered.

From the foregoing description considered in connection with the accompanying drawings, it is believed that the construction and mode of operation of the present conveyor will be clear and that its advantages will be appreciated. It is desired to point out, however, that while only a single structural embodiment of the invention has been illustrated and described, the same is readily capable of various other specifically different structural embodiments within the spirit and scope of the invention as defined in the appended claims.

We claim:

1. A conveyor of the character described comprising a vertically disposed rotatable article pusher unit including an annular series of bars extending longitudinally and substantially radially thereof in annularly spaced apart relationship to each other to accommodate therebetween the inner side portions of articles to be raised or lowered, article guide means surrounding said unit and cooperable with said bars to retain articles in the spaces between said bars and to constrain the articles to be moved in a circular path responsive to rotation of said unit, and a single article supporting rail of helical form surrounding said unit and along which the articles are advanced and hence moved vertically responsive to rotation of said unit, said rail being of narrow width to offer minor resistance to sliding of the articles along the same and being spaced inwardly from said article guide means to afford a space through which the fragments of broken articles may drop, said rail being disposed to extend substantially diametrically across the bottoms of the articles so as to minimize tendency of said rail to effect rotation of the articles about their own axes as they are advanced along said rail.

2. A conveyor as set forth in claim 1 in which the article guide means comprises a rail spaced above the article supporting rail.

3. A conveyor as set forth in claim 1 in which the article guide means comprises vertically spaced apart rails the lowermost of which is spaced above the article supporting rail.

4. A conveyor of the character described comprising a vertically disposed rotatable shaft, vertically spaced wheels fixed to said shaft and having therein and opening through their peripheries vertically extending annularly spaced slots, vertically disposed core bars extending between said wheels and having their inner portions snugly engaged in said slots and their outer portions projecting outwardly beyond said wheels, means fastening said core bars rigidly to said wheels, vertically disposed annularly spaced article pusher bars bifurcated at their inner edges and engaged over the outer portions of said core bars, means fastening said article pusher bars rigidly to said core bars, article guide means surrounding said pusher bars and cooperable with the latter to retain articles in the spaces therebetween and to constrain the articles to be moved in a circular path responsive to rotation of said shaft and said article pusher bars, and article supporting means of helical form surrounding said pusher bars and along which the articles are advanced and hence moved vertically responsive to rotation of said shaft and said article pusher bars.

5. A conveyor as set forth in claim 1 in which the article supporting rail comprises a channel member and a length of rubber secured in and projecting above said channel member and upon which the articles rest.

6. A conveyor as set forth in claim 1 in which the article supporting rail comprises a channel member and a length of rubber expansively confined in said channel member and projecting there above and upon which the articles rest.

EUGENE A. WAHL.
WILHELM BOEHL.
OTTO A. BADENHAUSEN.

REFERENCES CITED

The following references are of record in the file of this patent:

UNITED STATES PATENTS

| Number | Name | Date |
|---|---|---|
| 1,651,912 | Thompson | Dec. 6, 1927 |
| 2,111,892 | Horner | Mar. 22, 1938 |